United States Patent
Lubin et al.

(12)

(10) Patent No.: US 6,434,395 B1
(45) Date of Patent: Aug. 13, 2002

(54) PORTABLE COMMUNICATIONS AND DATA TERMINAL HAVING MULTIPLE MODES OF OPERATION

(75) Inventors: Michael L. Lubin, Del Mar; Seton P. Kasmir, San Diego; Kathryn A. Kubasak, Carlsbad; Gregory A. Hein, Encinitas; Surendra B. Mandava, San Jose; Chanchai Poonpol, San Diego; Shahin Hedayat, San Ramon; Donald W. Burtis, Los Altos, all of CA (US)

(73) Assignee: Pacific Communications Sciences, Inc., CA (US)

( * ) Notice: Subject to any disclaimer, the term of this patent is extended or adjusted under 35 U.S.C. 154(b) by 0 days.

(21) Appl. No.: 08/769,036

(22) Filed: Dec. 18, 1996

Related U.S. Application Data

(63) Continuation of application No. 08/117,913, filed on Sep. 8, 1993.

(51) Int. Cl.⁷ .............. H04Q 7/20; H04B 7/00; H04L 27/00
(52) U.S. Cl. .............. 455/466; 455/553; 375/216
(58) Field of Search .............. 379/58; 375/216; 455/466, 553

(56) References Cited

U.S. PATENT DOCUMENTS

| | | |
|---|---|---|
| 3,564,150 A | 2/1971 | Muller |
| 3,575,558 A | 4/1971 | Leyburn et al. |
| 3,627,955 A | 12/1971 | Stone, Jr. |
| 3,906,166 A * | 9/1975 | Cooper et al. .............. 379/58 |
| 4,352,955 A | 10/1982 | Kai et al. |
| 4,613,990 A * | 9/1986 | Halpern .............. 455/33.1 |
| 4,654,867 A * | 3/1987 | Labedz et al. .............. 379/59 |
| 4,661,972 A | 4/1987 | Kai |

(List continued on next page.)

FOREIGN PATENT DOCUMENTS

| | | |
|---|---|---|
| CA | 2063901 | 9/1992 |
| EP | 0 259 129 | 3/1988 |
| EP | 0473 297 A2 | 3/1992 |

(List continued on next page.)

OTHER PUBLICATIONS

Meyers, "A Substandard Standard", Telephony, Oct. 14, 1996.*
Mason, "CDPD: Scaring Customers?", Wireless Week, Oct. 28, 1996.*

(List continued on next page.)

Primary Examiner—William Cumming
(74) Attorney, Agent, or Firm—James J. Murphy, Esq.; Winstead Sechrest & Minick

(57) ABSTRACT

A portable radio telephone handset includes the capability of operating as a data transfer terminal as well as an analog cellular telephone subscriber station. Two modes of operation are available in the handset, an analog cellular communication mode and a Cellular Digital Packet Data (CDPD) mode. A paging function for incoming analog cellular communication is carried out on a CDPD channel. The handset distinguishes between paging signals identifying CDPD mode communications and paging signals identifying analog cellular communications. The handset automatically preempts CDPD communications in favor of analog cellular communications such as those carried out in an AMPS configuration.

6 Claims, 5 Drawing Sheets

U.S. PATENT DOCUMENTS

| | | | |
|---|---|---|---|
| 4,802,200 A | | 1/1989 | Murata et al. |
| 4,812,843 A | | 3/1989 | Champion, III et al. |
| 4,825,456 A | | 4/1989 | Rosenberg |
| 4,850,006 A | * | 7/1989 | Sasaki et al. ................. 379/58 |
| 4,887,265 A | * | 12/1989 | Felix .......................... 370/94.1 |
| 4,947,420 A | | 8/1990 | Stahl et al. |
| 4,962,523 A | * | 10/1990 | Tanaka ......................... 379/58 |
| 5,008,925 A | * | 4/1991 | Pireh ............................ 379/60 |
| 5,020,091 A | | 5/1991 | Krolopp et al. |
| 5,054,052 A | | 10/1991 | Nonami |
| 5,117,449 A | | 5/1992 | Metroka et al. |
| 5,119,397 A | * | 6/1992 | Dahlin et al. .............. 455/33.1 |
| 5,128,980 A | | 7/1992 | Choi |
| 5,148,473 A | | 9/1992 | Freeland et al. |
| 5,153,903 A | | 10/1992 | Eastmond et al. |
| 5,166,973 A | | 11/1992 | Hoff |
| 5,168,574 A | * | 12/1992 | Gordon et al. ................. 455/9 |
| 5,175,758 A | | 12/1992 | Levanto et al. |
| 5,195,090 A | | 3/1993 | Bolliger et al. |
| 5,199,031 A | * | 3/1993 | Dahlin ..................... 370/110.1 |
| 5,200,957 A | * | 4/1993 | Dahlin ..................... 370/100.1 |
| 5,202,912 A | | 4/1993 | Breeden et al. |
| 5,203,020 A | * | 4/1993 | Sato et al. .................... 455/68 |
| 5,212,722 A | * | 5/1993 | Murata ......................... 379/58 |
| 5,228,074 A | | 7/1993 | Mizikovsky |
| 5,247,566 A | * | 9/1993 | Hiramatsu ................... 379/58 |
| 5,247,700 A | | 9/1993 | Wohl et al. |
| 5,249,218 A | * | 9/1993 | Sainton ........................ 379/59 |
| 5,253,287 A | * | 10/1993 | Hasegawa .................... 379/61 |
| 5,257,401 A | * | 10/1993 | Dahlin et al. .............. 455/33.2 |
| 5,265,270 A | * | 11/1993 | Stengel et al. .............. 455/343 |
| 5,274,699 A | * | 12/1993 | Ranz ........................... 379/142 |
| 5,291,518 A | * | 3/1994 | Stutman ........................ 375/4 |
| 5,335,355 A | * | 8/1994 | Tanaka et al. .............. 375/216 |
| 5,396,539 A | * | 3/1995 | Slekys et al. ................. 379/58 |
| 5,479,479 A | * | 12/1995 | Braitberg et al. ............. 379/58 |
| 5,533,019 A | * | 7/1996 | Jayapalan .................. 370/60.1 |
| 5,533,029 A | * | 7/1996 | Gardner ..................... 370/94.1 |

FOREIGN PATENT DOCUMENTS

| | | | | |
|---|---|---|---|---|
| EP | 514 360 A2 | | 11/1992 | |
| EP | 0521 609 A3 | | 1/1993 | |
| EP | 0 521 610 A3 | | 1/1993 | |
| GB | 2239567 | * | 7/1991 | ................. 379/58 |
| JP | 0457592 | * | 2/1992 | ................. 379/58 |
| WO | WO 91/07044 | | 3/1991 | |
| WO | WO 92/09178 | | 5/1992 | |

OTHER PUBLICATIONS

Mason, "AT&T GTE Sign Major CDPD Deal", Wireless Week, Aug. 5, 1996.*

Alleven, "Smart Phones May Appeal to Execs", Wireless Week, Sep. 2, 1996.*

Baghdady, "Directional Signal Modulation by Means of Switched Spaced Antennas", IEEE, 1990.*

Hello Direct, "Cellbase", 1995.*

Arrendondo, Feggeler, Smith, "Advanced Mobile Phone Service: Voice and Data Transmission", Jan. 1979.*

Americal Online, "Cellular Digital packet Data (CDPD) service based on the new CDPD 1.1", Mar. 1996.*

America Online, "Point–of–Sale (POS) credit card verification and debit card transactions", Feb. 1996.*

America OnLine, "Audiovox's MVX–800 Celluar Phone", Apr. 19, 1995.*

America OnLine, "Oracle's Implementation of New Technology" May 8, 1995.*

America OnLine, "HP Open Mail", May 8, 1995.*

America OnLine, "Integrated Voice and Cellular Digital Packet Data (CDPD) Network Analyeve", Jun. 15, 1995.*

Booker, "Cellular Nets to Ride Analog Voice Lines" Computerwold Jul. 26, 1993.*

Wexler, "Moving Toward a Wireless Infrastructure," Computerworld Oct. 11, 1993.*

Wireless, "The Sky's No Limit", Nov. 1993.*

Byte, "Cirrus Subsidian Leads CDPD Push", Nov. 1993.*

Wirbel, "Connecting the Wirless World", Electronic Engineering Times., Mar. 1, 1993.

Weber, "PCs On the Go Are Causing a Burst of Activity", Electronic Engineering Times, Mar. 29, 1993.

* cited by examiner

PORTABLE COMMUNICATIONS AND DATA TERMINAL HAVING MULTIPLE MODES OF OPERATION

This application is a continuation of application Ser. No. 08/117,913 filed Sep. 8, 1993.

TECHNICAL FIELD

This invention relates generally to wireless communication devices. More particularly, the invention relates to wireless portable phones supporting transmission and reception of data, fax, and voice signals.

BACKGROUND OF THE INVENTION

Mobile wireless communication of analog voice signals was initially carried by half duplex radio systems. Citizens Band radio, one type of mobile wireless radio, uses amplitude modulation (AM) upon a carrier frequency to transmit or receive voice signals in a half duplex manner. Other mobile wireless radios used frequency modulation (FM) within a given carrier frequency range in order to transmit or receive voice signals, half duplex, achieving improved noise characteristics. These mobile wireless radios allowed a user to move within a given radius of antennas. A disadvantage to these systems was that once a user was beyond a certain range of a given base antenna, the radio channel for a given carrier frequency was inoperative. Another disadvantage was that wireless half duplex voice communication was unacceptable to most consumers. The consumer wanted a wireless duplex voice communication system similar to his or her wired home telephone.

In the 1980's, mobile wireless duplex voice communication was introduced into the marketplace by using an analog FM based cellular radio. This analog cellular system for mobile wireless duplex voice transmission was called "Advanced Mobile Phone Service" (AMPS). Introduced by AT&T, the AMPS cellular network uses the FCC assigned carrier frequency range of 800 to 900 MHz. AMPS automobile cellular units were first permanently attached to the user's car. Automobile cellular units transmitted voice signals to a cellular base station within a given cell using one watt of power. Hand-held cellular units using battery power supplies were later introduced and transmitted voice signals to a cellular base station within a given cell using one quarter watt of transmit power. Because hand held cellular units operated from a battery power supply, the power consumed by the cellular phones became critical.

When a cellular phone is powered on and waiting to receive a phone call, it is in a stand-by mode consuming less power than in an active mode. However, when the hand held unit is in a stand-by mode, it constantly listens for its registration number in order to become active and receive a phone call. The stand-by mode, although lower in power than the active communication mode, continuously uses a considerable amount of power. It is desirable to further decrease the amount of power used in the stand-by mode in order to further increase the time the cellular unit requires for recharging or replacing batteries.

The human analog voice was the initial signal that the AMPS system was designed to communicate. The AMPS system was optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of antennas whereby a user's signal is handed off to the next cell site as he moves into a different cell area. This cellular handoff can cause a temporary loss in transmission or reception. However, temporarily losing a voice signal is not critical because a user knows when there is a signal loss and can retransmit the voice information. However, signal loss, even though temporary, poses special problems for transmission of digital data. Some other AMPS mobile cellular problems causing a loss in a voice signal are fading signal strength, reflections, Rayleigh fading, and cellular dead spots.

The availability of portable computers naturally led to the desire to transmit digital data via wireless from a remote location. Presently, the AMPS voice cellular system is being used to transmit digital data in the form of Circuit Switched Cellular Data across AMPS carrier channels. Raw (baseband) digital data is converted so that it can be transmitted and received across the analog AMPS system. One disadvantage to using the AMPS system is that a narrow channel bandwidth and errors in transmission limits the baud rate of transmitting and receiving digital data. Another disadvantage of using AMPS to communicate digital data is that movement of the subscriber unit may cause a cellular handoff to occur, thus causing a loss of the digitally transmitted or received information. Loss of digital data may corrupt a data file such that it is useless. Other losses of the raw digital data may be caused by other problems of the AMPS mobile cellular system.

Another wireless communication device is a pager. Most pagers use simplex or one way communication receiving only a limited amount of information such as a telephone number. Most pagers only display information to a user on demand and perform no other function. Because only one way communication is required, an acknowledgement is not returned by the pager to the original sender. In many cases it is desirable that a sending party receive an acknowledgement minimally, telling him that his page message was received. In some cases it may be appropriate to respond by leaving a return page message. A disadvantage of present paging systems is that acknowledgment and return pages are not widely available because simplex paging is more commercialized than other paging modes. Another disadvantage of present pagers is that a displayed telephone number is not automatically and electronically dialed directly on a telephone. A user reads the telephone number from a pager's display and manually dials the number on a telephone in order to contact the paging party. It is desirable that a wireless pager have the capability of automatically dialing a received telephone number on a wireless cellular telephone via electronic means, thus integrating the features of a wireless cellular telephone with that of a duplex pager.

A wired product that is presently popular is high speed fax-modems. Fax-modem hardware and firmware in conjunction with fax and data communication application software have the capability of sending digital data over various modem protocols as well as sending facsimile data by using the various facsimile protocols. Fax or data communication application software may operate on different hardware such as home or portable computer, personal communicator, personal digital assistant, or other electronic devices. Examples of modem protocols for standard modulated data are CCITT V. 22bis, CCITT V. 23, CCITT V.32, Bell103, and Bell212A. Modem protocols that include error control include CCITT V.42, MNP2, MNP3, MNP4, and MNP10. Modem protocols that provide data compression are CCITT V. 42bis and MNP5. Facsimile protocols include CCITT V.21, CCITT V.27ter, CCITT V.29, CCITT T.4, CCITT T.30, CCITT T.35, Class I-EIA/TIA 578, Class I-EIA 592, and Class II-EIA 578-SP2188. A fax-modem accepts raw (baseband) digital data from an electronic device over an internal data bus or external RS-232 port. Raw digital data is converted and modulated into data of a given protocol for transmission onto a standard telephone line. Data received from the telephone line can be converted from the modulated form into raw digital data that can be interpreted by the hardware, firmware and application software.

A disadvantage of present fax-modems is that most require a wire connection to a telephone line. Present methods of providing wireless capability for a fax-modem take the modulated analog modem output signal from a fax-modem and input this into an AMPS conversion unit. The AMPS conversion unit converts and modulates the transmitted analog modem output signal into a different analog form for transmission onto the AMPS network The analog modem output signal is converted into what is called Circuit Switched Cellular Data. Received AMPS signals can be converted from Circuit Switched Cellular Data by the AMPS conversion unit into analog modem input signals that the fax-modem can receive. Presently, fax-modems do not directly convert and modulate raw digital data into an analog signal for transmission onto the AMPS cellular network. A disadvantage to present methods of providing wireless fax-modem capability is that it requires additional devices to send or receive fax and digital data over the AMPS cellular network. Another disadvantage is that more power is necessary for additional components, such as the AMPS conversion unit. Another disadvantage is that a user must carry the portable computer, fax-modem, and AMPS conversion unit to provide wireless fax-modem capability. It is desirable to incorporate a fax-modem and AMPS conversion unit into one unit providing the capability of sending Circuit Switched Cellular Data across the AMPS network.

A disadvantage to using Circuit Switched Cellular Data communication across AMPS is that it requires that the mobile unit be stationary to avoid losing data from fading or cellular handoff associated with a non-stationary mobile AMPS communication. Thus, a mobile unit should avoid being moved even slightly when performing communication of Circuit Switched Cellular Data using the AMPS network.

Heretofore, providing efficient wireless transmission of both voice and data signals into one small hand held integrated package has been difficult. Furthermore, it is difficult to integrate the features of AMPS voice transmission with applications such as data transmission, electronic mail, duplex paging and provide a Circuit Switched Cellular Data interface such as a wireless fax-modem into a single hand held battery operated wireless unit. Further, the integration of these features into a single hand held unit has not been possible because of the unavailability of the underlying electronic components and application software required to integrate all these features into a single hand held unit. It is desirable to integrate AMPS voice communication and a data communication mode when moving between cell sites, as well as providing the capability of providing Circuit Switched Cellular Data Communication into one integrated hand-held unit.

BRIEF SUMMARY OF THE INVENTION

An object of the present invention is to combine the capabilities of a voice cellular telephone, pager, and wireless fax-modem into one integrated battery operated hand held unit.

Still a further object of the present invention is to reduce the standby power consumption of a cellular telephone such that continuous operating capacity of the battery of a cellular telephone is increased.

Another object of the present invention is to achieve mobility in the transmission of digital and facsimile information without incurring errors.

Still a further object of the present invention is to integrate a paging system into an analog cellular telephone system.

Yet another object of the present invention is to facilitate automatic call-back on a mobile communication terminal in an analog cellular telephone system in response to a paging signal.

The aforementioned objects are carried out by a portable radio telephone handset of the present invention, including means for communicating in an analog cellular mode, means for communicating in a Cellular Digital Packet Data (CDPD) mode and means for selecting between the two modes.

Preferably, paging is carried out using the aforementioned handset by (a) maintaining the portable radio telephone handset in a low-power, dormant state; (b) periodically detecting for a paging signal on a CDPD channel; (c) analyzing the incoming paging signal to derive information contained therein; and (d) discriminating between information in the paging signal pertaining to a CDPD transmission and information pertaining to an analog cellular mode transmission.

In another embodiment of the present invention, a portable communication terminal includes a radio frequency transceiver switchably operable in either an analog cellular mode or a Cellular Digital Pack Data (CDPD) mode and processor means for controlling operation in both the analog cellular mode and the CDPD mode. A telephone handset is included as part of the portable communication terminal to facilitate voice communication.

Another object of the present invention, accordingly, is to combine the capabilities of wireless communication using analog voice signals and CDPD data while providing a host interface for wireless communication using Circuit Switched Cellular Data or CDPD Data, all arranged in one integrated battery operated hand held unit.

A further object of the present invention is to provide AMPS system imaging over a CDPD channel and then automatically dialing the received paged telephone number using the AMPS network so that a paged user can communicate with the paging party.

Yet another object of the present invention is to be able to automatically switch from communications on the CDPD network into communications using the AMPS network.

Yet a further object of the present invention is to dock a cellular handset to a portable computer, personal digital assistant, or some other personal communications device and provide an interface in which to transmit or receive CDPD data from the CDPD network and communicates in both AMPS voice and AMPS circuit switched cellular data modes.

Another object of the present invention is to provide expansion capability for future CDPD applications that can operate from a hand held integrated unit.

DETAILED DESCRIPTION OF THE PREFERRED EMBODIMENTS

Figure 1:
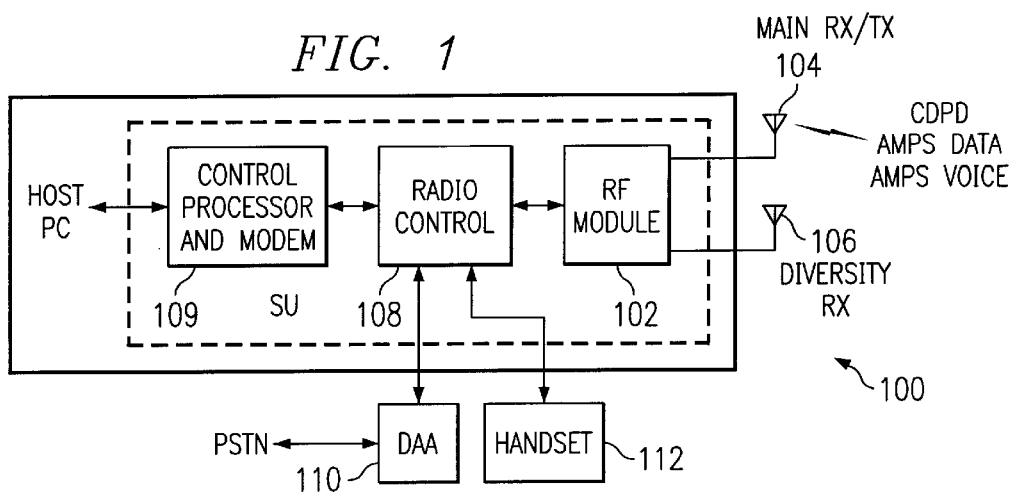
FIG. 1 is a block diagram a portable radio telephone handset in relation to other external system elements.

One solution to the aforementioned difficulties of integrating portable voice and data communications resides in a new digital wireless communication technology developed to overcome some of the undesirable effects of transmitting raw digital data over the AMPS system. This new digital wireless communication system and network is called Cellular Digital Packet Data (CDPD). The CDPD communication system shares the same carrier frequencies assigned to the AMPS channels, and adheres to the standards set forth in the CDPD specification. A base unit, mobile data base station (MDBS), of the CDPD system utilizes an unused channel within an AMPS cell to establish a link and communicate to a user's mobile end system. The mobile end system is a portable computer or other portable electronic device containing a subscriber unit. An MDBS then communicates from the user across a service provider's network of wire lines, microwave links, satellite links, AMPS cellular links, or other CDPD links in order to transmit data to another mobile end system, computer network, or other non-mobile electronic system. Within a cell area the MDBS first performs "RF sniffing" in order to detect an unused AMPS channel. CDPD use of an AMPS channel is limited to the idle time between AMPS channel access. If an AMPS cellular unit begins transmitting on a channel occupied by CDPD, the CDPD unit ceases transmitting on that channel and waits until the same channel becomes available or switches, referred to as channel hopping, to a different available channel.

Within the CDPD network, digital data is burst mode transmitted between a given subscriber unit (SU) within a mobile system and a mobile data base station (MDBS) using Gaussian Minimum Shift Keying (GMSK) modulation. Communicating in a burst mode fashion reduces the time that an SU communicates with an MDBS such that other SUs can talk with the same MDBS. For a given data size, the CDPD connect time is reduced considerably when compared to sending digital data over the AMPS network. Presently the raw (baseband) digital data envisioned being transferred across CDPD are electronic mail messages, digital fax data, or digital data representing a network connection such that files may be transferred as if currently connected to a local area network. Other CDPD applications are being developed such as CDPD duplex paging.

The CDPD subscriber unit was designed to be inserted into a given computer displacing the floppy disk drive. The subscriber unit interfaces to the computer's internal data bus such that data can be transmitted or received across the CDPD network. In this manner electronic mail, electronic faxes, and data files can be sent without use of a landline system. However, it may be not economical to transfer large digital data files using the wireless CDPD network. In this case using a standard data modem connected to the wired telephone system may be preferred.

A disadvantage of present portable computers is that many are still too large and heavy for continuous use by a majority of consumers, especially with cellular handsets. Furthermore, many consumers do not require the computing power contained in a portable computer nor desire to pay for such expense just to utilize the CDPD network. However, the consumer may still desire to send a limited amount of digital information through a wireless system such as the CDPD network. In other cases it may be desirable to share a subscriber unit amongst company employees such that only the employee on travel requires the subscriber unit.

Interchanging a CDPD subscriber unit from one persons portable computer to another's portable computer is difficult. It is preferable that a user be able to easily interface a portable computer or other electronic device to a form of CDPD subscriber unit for communication across the CDPD network.

Integration of cellular voice communication and data communication is facilitated by the device of FIG. 1 illustrating a block diagram of the portable communication terminal handset 100 of the present invention. In most respects this portable communication terminal is similar to conventional portable radio telephone handsets in that it includes a radio frequency module 102 having at least one radio frequency transceiver. The radio frequency transceiver uses a main antenna 104 for both receiving and transmitting the various types of signals handled by the portable terminal, such as Advanced Mobile Phone System (AMPS) data (circuit switched cellular data) communication, AMPS voice communication and CDPD communication. A diversity antenna 106 is used as a backup to maintain reception under certain adverse conditions. A telephone type handset 112 is used to facilitate AMPS voice communication.

The portable terminal can also be patched into a local public switch telephone network (PSTN) by way of a digital-analog access interface (DAA) connected to the radio control processor 108. This processor along with control processor and modem 109 divides the various control functions of the portable terminal including call setup, high level protocol, low level protocol, power adjustment, modem operation and data transfer between an external host computer. To facilitate ease of subscriber use, the host computer can be a personal computer (PC) or personal digital assistant (PDA) or other electronic device. The connection hardware of the portable terminal is of a standard type normally used with PC external connectors.

One key difference between the portable terminal of the present invention and conventional cellular handsets and data terminals is the capability of the two processors 108, 109 to control the RF module for communication in both the AMPS mode and the CDPD mode. The RF module 102 is both automatically and manually controlled to operate either in the CDPD mode or the AMPS mode in a manner consistent with the interrelation between the AMPS system and the CDPD system.

The CDPD network is designed to operate as an extension of existing data communications networks. A CDPD network shares the transmission facilities of existing analog cellular telephone networks, such as an AMPS network. The CDPD mobile data base station (MDBS) equipment is located at a cellular carrier's cell site and is integrated with existing AMPS base station cellular equipment. CDPD provides a non-intrusive packet-switched data service that shares frequency channels with AMPS networks without impacting on AMPS service. This is done via the end-user subscribers (analogous to the mobile subscribers in a cellular system). The packetized nature of the data transmission from the mobile subscribers allows many CDPD users to share a common channel, accessing the channel only when they have data to send and otherwise leaving it available to other CDPD users. For users whose data transmission requirements are characterized by numerous transmissions of short to medium duration, CDPD is a far more effective mode of communication than circuit switched cellular data modems. CDPD has been adopted as a national standard by the cellular industry.

In comparison to AMPS to which the CDPD system is appended, the infrastructure requirements of the CDPD system are very small. The multiple access nature of the system makes it possible to provide substantial CDPD coverage to many users simultaneously with the installation of only one CDPD radio in a given sector. Unlike AMPS, which uses in-band FSK signaling to establish call connections and out-of-band (control channel) signals to control the mobility, CDPD uses a sophisticated set of in-band protocols to control channel access and mobility and to manage the transfer of data throughout the CDPD network.

Although the CDPD system shares existing AMPS radio frequency channels, AMPS calls are given first priority, and they are always able to preempt the use of any channel being used by CDPD. However, this protocol is not absolute and a cellular service provider may decide to dedicate one or more channels to CDPD use. In such a case, AMPS calls will not preempt the channel(s) occupied by CDPD signaling. In order to assign priority to predetermine type of signal, signal discrimination is necessary. In a mobile data base station (MDBS) employing CDPD, the most common technique includes "RF sniffing" to detect the presence or absence of AMPS activity on any given channel. In some systems, the base station can be given channel information directly by the AMPS equipment via a data interface. If the sniffer finds that a channel is not in use, the MDBS may establish a CDPD network on a particular channel by transmitting on a forward link. The mobile end user will acquire the forward link, register, and then begin to transmit packets on return channels according to a digital sense multiple access (DSMA) scheme in which the mobile end user accesses the channel only when they have data to send. Thus, CDPD network keeps track of the channels in use while the AMPS does not.

The present invention operates to allow the mobile subscriber to receive CDPD communication originated by other parties by providing discrimination between paging signals containing information regarding CDPD communication and paging signals containing information regarding AMPS communication. This discrimination is carried out by a controller including the IC microprocessor chips which maintain the cellular handset or portable data terminal in the CDPD mode until AMPS communication is requested. The power expenditure in this mode is considerably lower than that in the AMPS mode.

In the CDPD mode, a cellular handset operates as a fully functional CDPD mobile terminal. In order to participate in the CDPD network, the handset communicates with a Mobile Data Base Station (MDBS) using GMSK modulation on AMPS radio frequencies and occupying one AMPS channel. According to the present invention, the radio telephone handset will monitor received signal strength. Based upon the detected values, the handset will locate the strongest CDPD channel and register on that channel in the local cell. The handset will also locate and switch to a new CDPD channel whenever the local MDBS switches channels. The CDPD system will support hand-off to an adjacent cell if the portable radio telephone handset travels and receives signal level changes.

By using the CDPD mode as described above, the handset of the present invention has the capability of sending data messages such as electronic mail input by a handset key pad to other users in the CDPD network. The handset can also be used to transport data (via electronic mail/page/FAX/file) to and from the host computer via an appropriate I/O port and the CDPD network. Since the handoff sequence in the CDPD mode mitigates against data loss, successful data transfer can take place even when the mobile data terminal handset is moving from the cell site to another. While in the CDPD mode, the handset is able to conserve battery power by remaining in a dormant or "sleep" protocol when data is not being sent or received.

The data terminal handset will de-register from the CDPD network when another mode is selected either by the user or as established by predetermined protocol. De-registration normally occurs when the user chooses to initiate an AMPS data or voice communication. De-registration also occurs when a paging signal indicative of AMPS communication is received by the portable handset. The user of the handset can also choose to initiate data transmission over the CDPD system even after de-registration has occurred due to AMPS communication. In this case, it is only necessary for the user of the handset to begin communication after the AMPS communication has ended since re-registration would have occurred as soon as the non-CDPD communication had ended.

Figure 2:
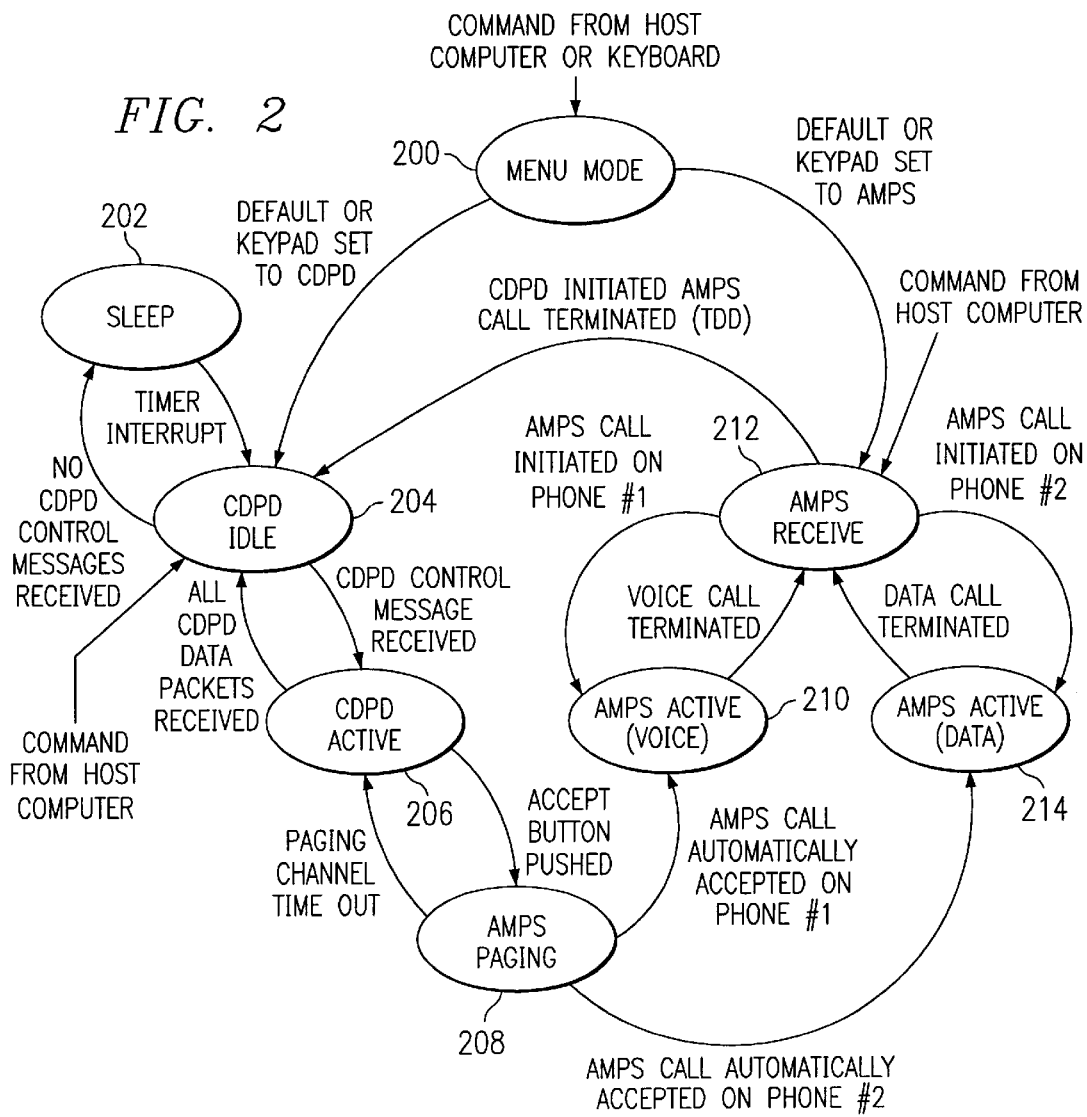
FIG. 2 is a representation of the operating modes available to the handset of the present invention when used in the appropriate cellular telephone system.

The portable data terminal handset as configured according to the specifications found at pages 10–12 of Appendix V, permits all the modes of operation illustrated in FIG. 2, for which the handset has capability. Circle 200 in FIG. 2 represents the menu mode selection by either the operator or programmer of the portable data terminal handset. Either of the two modes (AMPS or CDPD) can be selected by an operator using either the key pad on the handset 112 (FIG. 1) or an additional key pad used to import data into the system. If data is being entered into the portable terminal (handset) 100 by a host computer, either the mode or the predetermined default setting can be selected as part of that data transfer.

For best results, the present system is normally in a low-power "sleep" mode as indicated at circle 202. This "sleep" or dormant mode results in the least amount of power expenditure. Normally, the "sleep" mode will be interrupted every 10–255 seconds to check for messages such as incoming paging signals. If none are received, the CDPD mode remains idle as indicated at circle 204. The CDPD can be rendered active as indicated at circle 206 by the receipt of a paging signal, a command from the host computer or the handset user to initiate data transfer in the CDPD mode. The advantage of remaining in the CDPD mode is that the battery is not heavily burdened so that talk time at full transmission power is greater than one hour and standby time while monitoring the AMPS control channel is greater than 12 hours.

All paging is conducted on CDPD channels, but can convey data of an incoming AMPS communication as well as an incoming CDPD communication. If a paging signal indicating an incoming AMPS communication is received, the CDPD mode is interrupted (even if CDPD communication is being conducted at that moment), and one of the two AMPS modes (voice 210 and data 214) is activated. The user or a program from the host computer can select whether an AMPS voice call will preempt AMPS data communication. Depending upon the services the cellular telephone network and its associated land line network will support, different treatment can be given to different incoming calls depending upon the identification of the caller. For example, caller ID, call screening or an automatic call-back can be carried out with the portable data terminal/handset of the present invention.

Normally the handset will remain in the AMPS mode until all AMPS communication has ended. If instructions are not received to remain in the AMPS mode as indicated at circle 212, the handset will return to the dormant mode 202 and carry out the intermittent detection for paging signals in the CDPD mode.

The aforementioned special services such as caller ID and automatic call-back are carried out in the AMPS mode using the FSK control channel including BCH and Manchester encoding, framing, FSK modulation and amplification. FSK reception includes signal recovery (preferably using frequency discrimination), timing recovery, framing recovery, Manchester decoding and BCH decoding. To do this, the handset estimates received signal level, processing audio signals for FM modulation and recovering audio signals after FM demodulation. Audio processing includes the audio filtering, companding, pre-emphasis, deviation limiting, FM modulation, and amplification. The handset also generates SAT and ST signals and combines them with the processed audio signals before the FM modulation period. The receiver portion of the handset includes FM discrimination, de-emphasis, expanding, audio filtering, and amplification. Noise muting is preferably included in receiver processing. The receiver portion also detects an SAT tone and switches to voice mode following detection of a dotting sequence. The handset is capable of recovering data and audio information well in a high noise/high interference environment. The portion of the portable terminal carrying out AMPS communication complies with the standards and specifications enumerated on pages 12–14 of Appendix V. The AMPS mode will also support other communication techniques such as circuit switched cellular communication to effect a cellular modem. Using this technique, the handset of the present invention supports transmission of data and facsimile over the AMPS voice channel using modulation, facsimile, control and data compression standards as listed on page 6 of Appendix V. Using a connection to a public switch telephone network (PSTN), the portable radio telephone handset can support voice, modem and facsimile communication over an associated landline network.

Figure 3A:
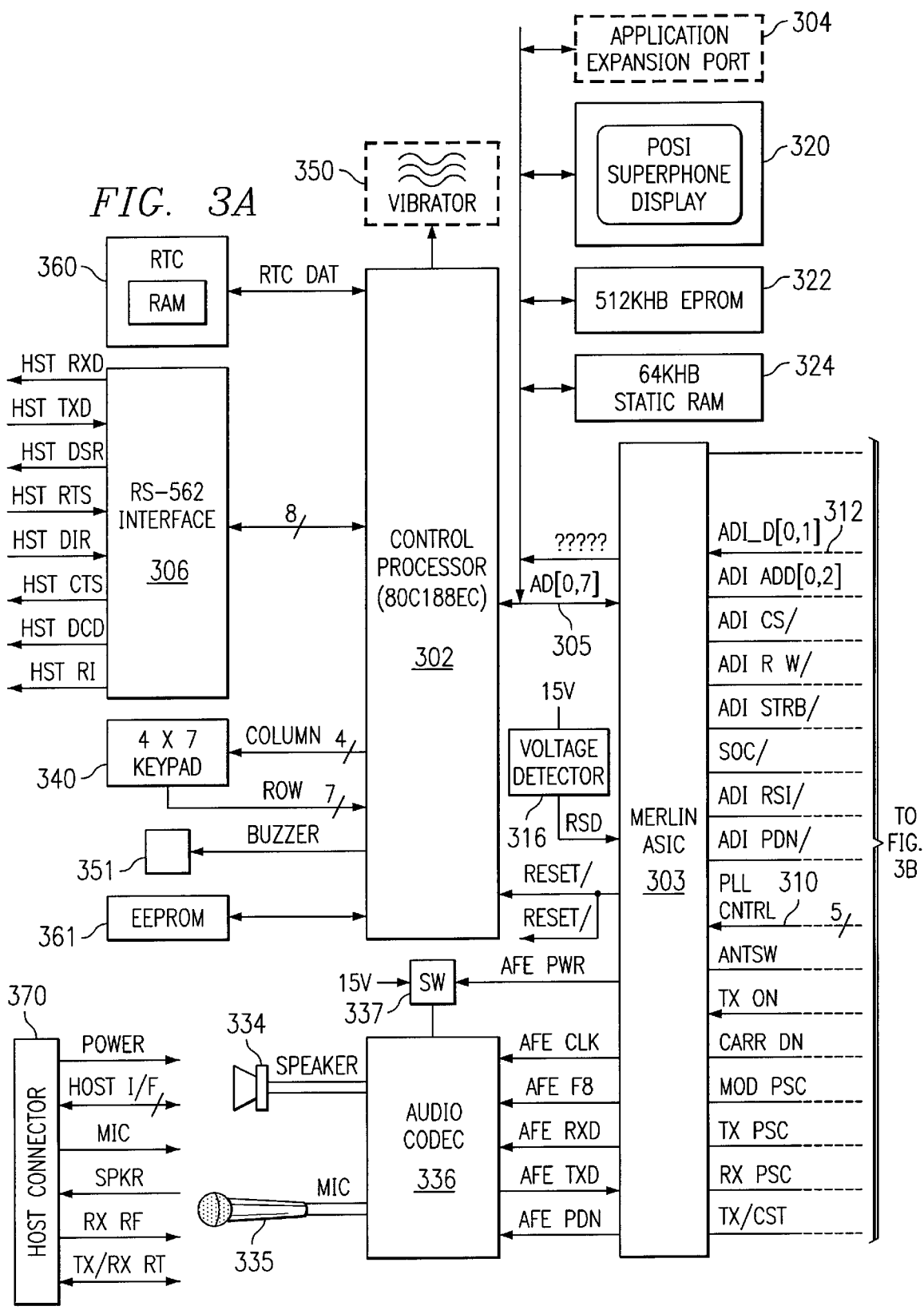
FIG. 3 is a block diagram illustrating discrete hardware components being included in the portable radio telephone handset.
Figure 3B:
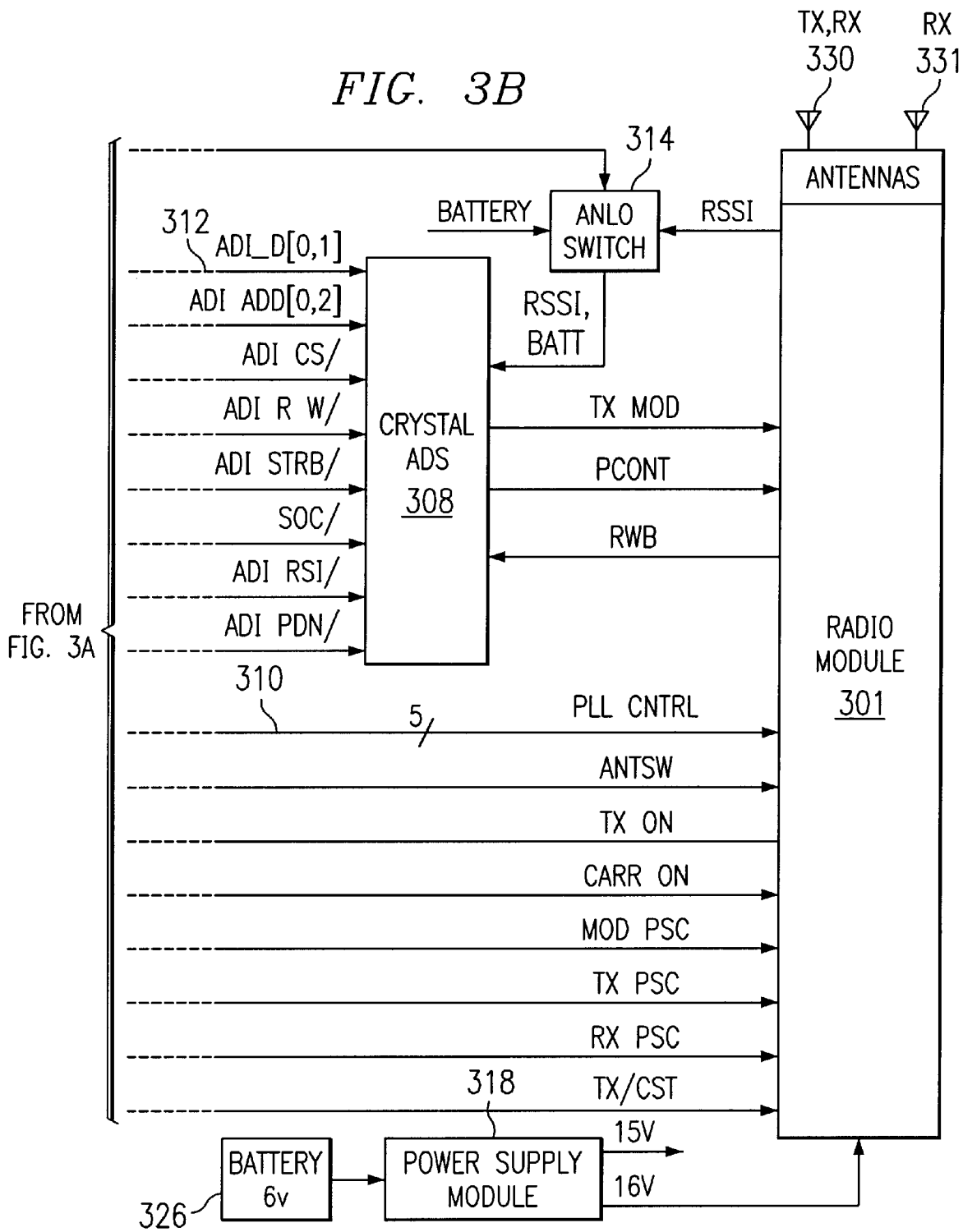

Another advantage of the present invention is the use of a common radio module 301 (in FIG. 3) and common processing means, constituted by control processor 302 and Merlin ASIC processing chip 303 for carrying out the functions of both the AMPS and CDPD communication modes. The processor chips 302, 303 are fully described in Appendix IV and divide the control functions of the portable terminal to effect the conversion between the AMPS communication mode and the CDPD communication mode. An application expansion port 304 feeds the data link 305 between the two processor chips 302, 303 in order to allow additional applications to be carried out by the processor chip pair by virtue of additional programmed chips.

The two processor chips 302, 303 are also meant to receive data and programming instructions from an external computer through RS-562 interface 306. For ease of operation, this external computer is preferably a personal computer (PC). An internal modem (not shown) can be included as part of the function of the two processor chips 302, 303. Preferably, the computer connected through interface 306 would be a portable device such as a portable digital assistant (PDA) so as to maintain the mobility of the overall data communication terminal handset.

Processor chip 303 controls the phase lock loop of radio module 301 through data line 310. Conversion of analog signals from radio module 301 into digital signals appropriate for processor chip 303 is carried out by analog-digital and digital-analog interface 308. The converted signals are carried between interface 308 and processor chip 303 by way of data trunk 312. In order to carry out the function of signal discrimination and monitor the power supply module 318 for proper power level, a voltage detector 316 provides an output to processor chip 303.

Power supply module 318 is preferably fed by a six volt battery 326. The power supply module 318 provides a number of different power levels commensurate with the type of operation carried out by the portable data terminal 100.

The overall power drain is most affected by radio module 301 which preferably contains at least one radio frequency transceiver. Normally this transceiver would operate in a frequency range of 824.040–848.970 MHz at a maximum power output of 0.6 watt. Radio module 301 has a diversity antenna arrangement including transmit/receive antenna 330 and receive antenna 331. This arrangement is used for a switchover when multipathing occurs in order to maintain the quality of the reception to radio module 301. From the signals received by radio module 301, RSSI (signal strength) data is derived and processed in interface 308 and processor chip 303. The RSSI data is displayed on the handset display 320 at least four times per second when the RSSI signal is routed to the display by means of analog switch 314.

As previously indicated, the control function of the portable data terminal is divided between processor chips 302 and 303. Chip 303 handles the power-down process occurring when the handset goes into the dormant "sleep" mode. Chip 303 also handles lower level protocol for most functions handled by both of the processor chips. Modem communication over an AMPS channel is also controlled by chip 303. Voice communication is effected using speaker 334 and microphone 335 connected to audio codec 336, which in turn is connected to processor chip 303 to receive the appropriate signals for audio communication. Audio codec 336 is activated by switch 337 when appropriate signals are received from processor chip 303.

Processor chip 302 handles call set up as well as high level CDPD protocol. DMA and UART functions are also handled by processor chip 302. Data is input by the user into the system by means of a 4×7 key pad 340. Preferably, all switches of the key pad 340 are a single pull, single throw switches with momentary contact. The key pad is usually provided with backlighting for user convenience.

Figure 4:
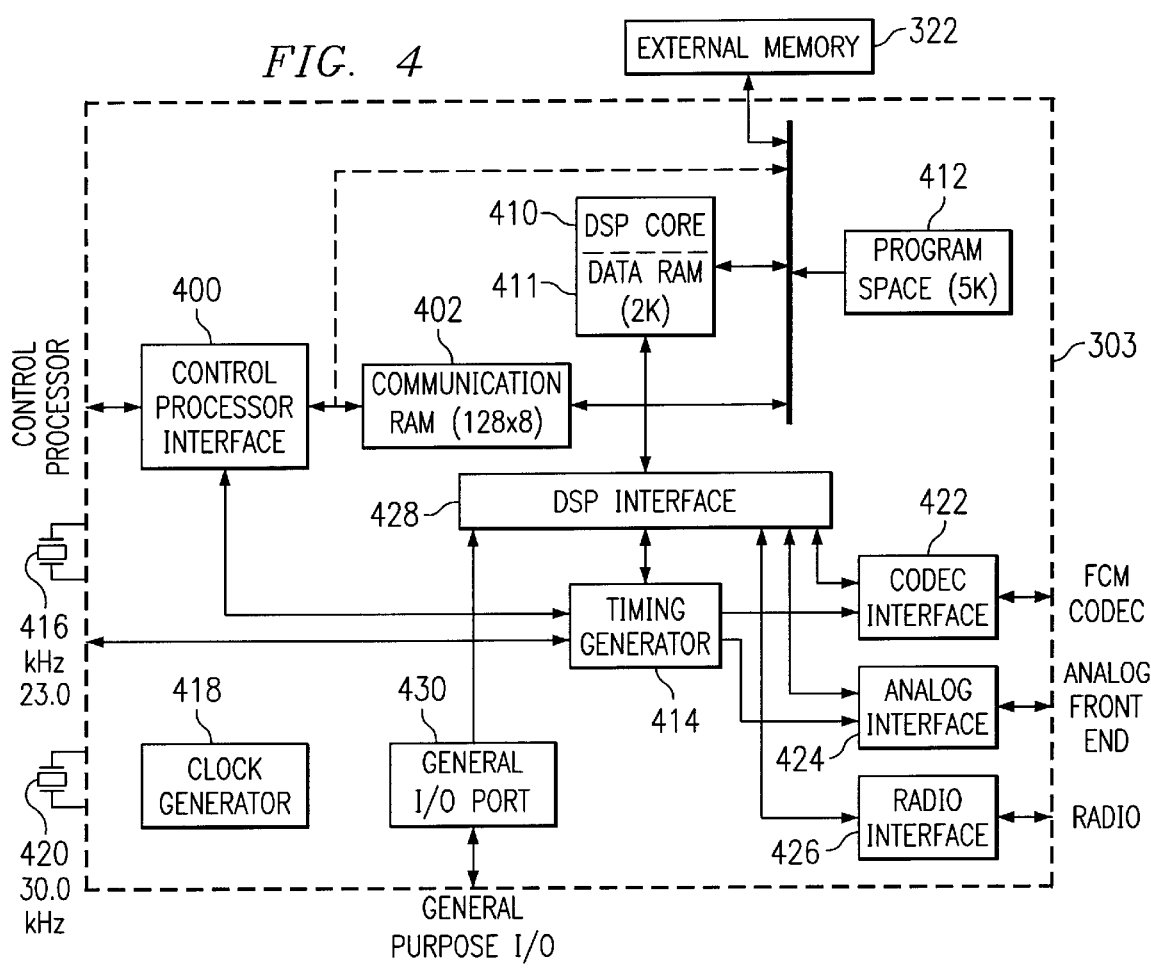
FIG. 4 is a functional block diagram of a processor chip employed in the portable radio handset of FIG. 3.
Figure 5:
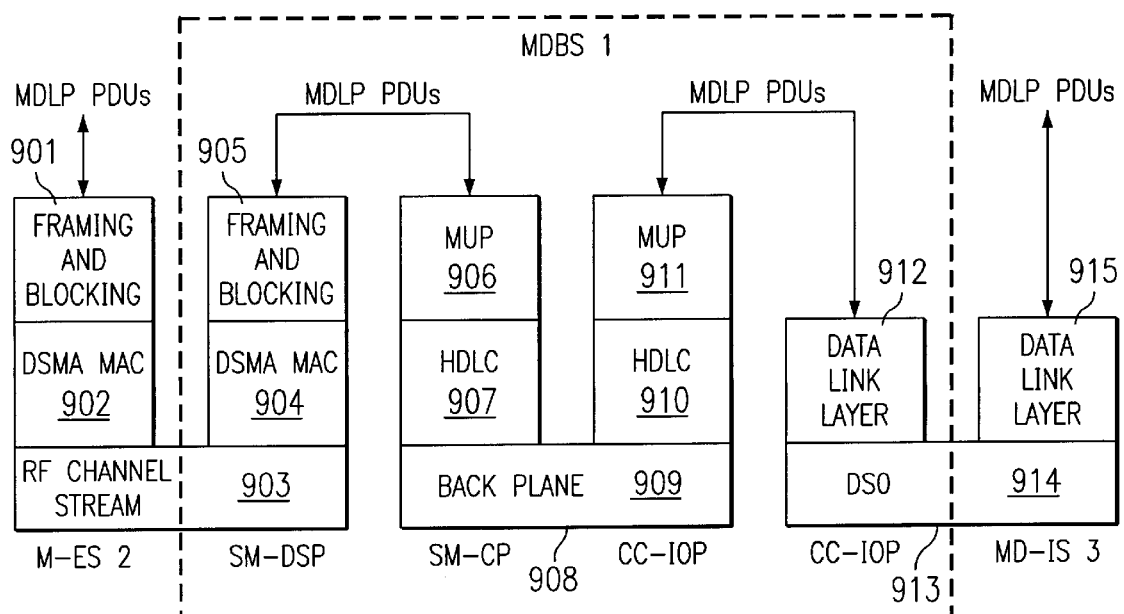
FIG. 5 is a block diagram depicting the communication protocols used between various parts of the CDPD system of FIG. 4.
Figure 6:
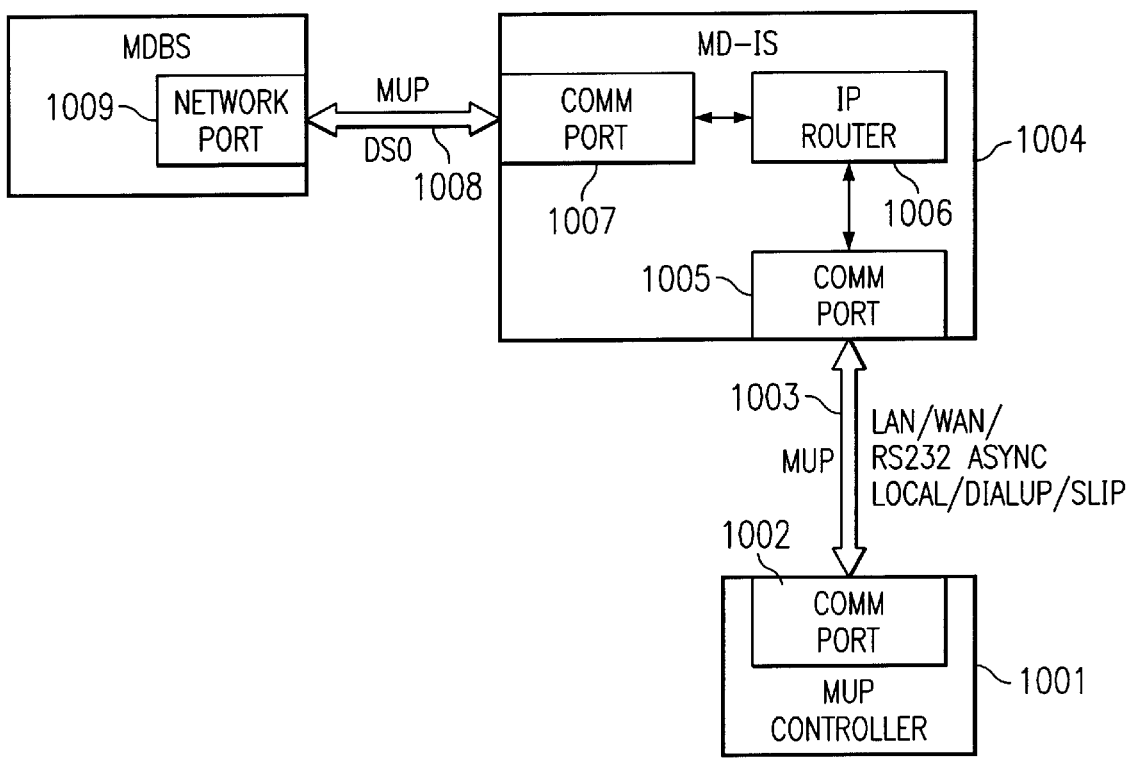
FIG. 6 is a block diagram depicting a simplified connection arrangement between additional elements of the CDPD system depicted in FIG. 4.
Figure 7:
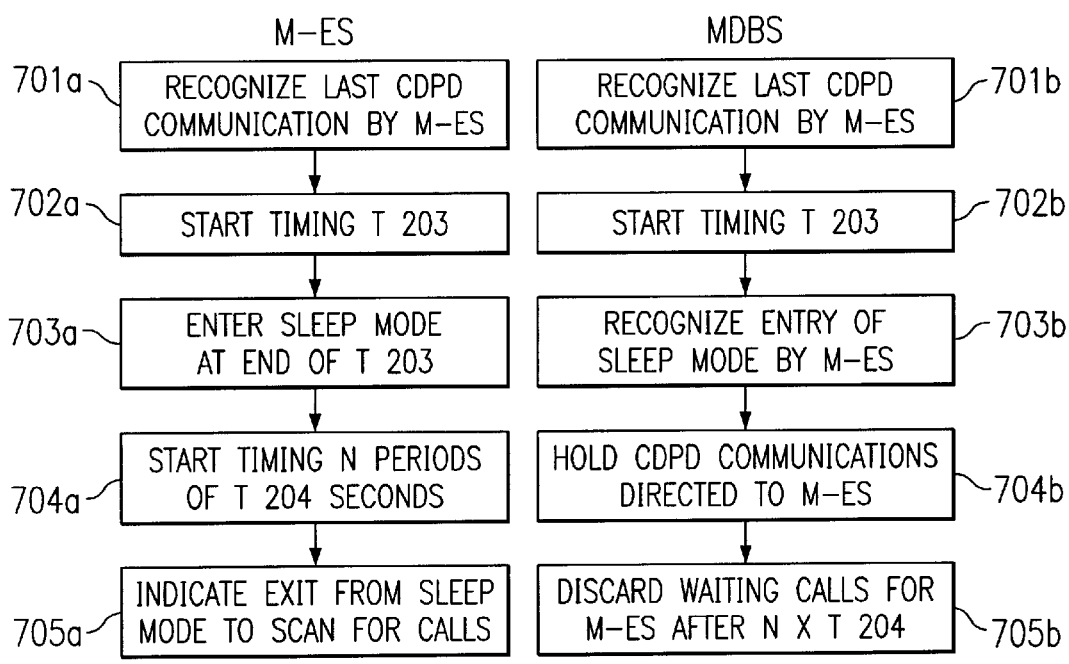
FIG. 7 is a flow chart depicting parallel operation for the handset and the Mobile Data Base Station used to carry out the present invention.

A functional block diagram of an exemplary embodiment of the processor chip 303 is depicted in FIG. 4. The processor chip 303 implements all of the data pump needs of an AMPS/CDPD/circuit switched cellular phone. The components include: an interface to a control processing unit; a digital signal processor (DSP) which supports AMPS voice, CDPD data, and Vseries modem functions over cellular; a timer which provides all of the required digital system clocks; a codec interface to the audio or wireline portion of the phone; and a data and control interface to an analog conversion front end; an interface to the module 301 for control and status checking; and a clock and reset control module.

The processor chip 303 has a control processing unit (CP) interface 400 that is the principal means of inter-processor communication, and allows the data pump and the control processor 302 to exchange data, status, and control information. This interface 400 accommodates 8-bit microprocessors with either multiplexed address/data or dedicated address and data busses. Through this interface 400, up to 128 bytes of communication RAM are accessible. There are also eleven dedicated addressable registers in this interface 400 for supporting features such as direct memory access (DMA), interrupt generation, watch dog timer resets, and fast code up/downloading.

The CP interface 400 accommodates 8-bit control processors with either multiplexed address/data or dedicated data busses. The interface between the external control processor 302 and the CP interface 400 is asynchronous. Internal to the processor chip 303, reads and writes to a communication RAM 402 and command/status registers are synchronized to a 23.04 MHz system clock.

Typically, DSP accesses to this interface 400 occur in one 23.04 MHz clock cycle. If the DSP 410 and the external control processor 302 access the same location in the CP interface 400 simultaneously, the interface hardware "steals" cycles from the control processor access period to get the data to the DSP 410. This allows both the DSP 410 and the control processor 302 access to this interface 400 with no wait cycles as long as the DSP 410 does not attempt to read or write in two consecutive clock periods. In the situation where the DSP 410 accesses the CP interface 402 in consecutive cycles while the control processor 302 is trying to access the CP interface 400, the interface hardware generates a wait signal to the control processor 302.

The communication RAM 402 is the principal means of inter processor communication and is used to transfer CDPD, circuit-switched cellular, and command/status data. In the exemplary embodiment, the communication RAM 402 is a 128×8/64×16 dual-port RAM that is read/write accessible by both the control processor 302 and DSP 410. The communication RAM 402 supports byte access for the control processor 302 and 16-bit word access for the DSP 410.

Along with the communication RAM 402, as shown in FIG. 8, the CP interface 400 has two dedicated addresses which allow the control processor 302 to generate and clear interrupts to the DSP 410 and the DSP 410 to generate and clear interrupts to the control processor 302. The control processor 302 can also generate an interrupt to the DSP 410 when it is in a sleep mode by toggling a control processor chip select line. Additionally, the CP interface 400 contains an address which the control processor 302 can read to reset an on-chip watch dog timer.

Three dedicated control processor registers and one dedicated DSP register form a DMA interface that supports DMA access to the processor chip 303. The processor chip 303 acts as a DMA slave device which requests servicing of three independent DMA channels. These channels are mapped to two read DMA registers and one write DMA register. Along with these registers, there are three separate pairs of request and acknowledge lines. The DSP 410 enables and polls the status of the DMA request lines through its dedicated DMA command/status register. An acknowledge in response to a request accesses the appropriate one of the three dedicated registers (independent of the CP interface address lines).

The CP interface 400 also supports download and upload of the DSP program memory by the control processor 302. Since the DSP 410 only has RAM on chip, it needs to receive program data from the control processor 302 or external memory 322 when it is first powered up. A control signal directs the DSP 410 to boot from an external memory or to wait for a download from the control processor 302 before booting from internal memory. To control the memory transfer, the control processor 302 accesses a control register to hold the DSP 410 in tristate or reset. The CP interface 400 allows the control processor 302 to write a start address (low byte first) and then read or write data (low byte first). The CP interface 400 automatically increments the address to a DSP program memory 412 and allows the control processor 302 to continue reading or writing data only. When the transfer process is complete, the control processor 302 releases the DSP 410 from tristate or reset.

In the embodiment of the processor chip 303 of FIG. 4, the data pump core is a 16-bit DSP 410 with two banks of 1K×16 data RAM 411 and one bank of 8K×16 program RAM 412. This core also supports up to 48K×16 of external memory. The DSP hardware supports an operating frequency up to 24 MHz. As a RAM based data pump, each processing mode (CDPD, AMPS, or circuit switched cellular) is supported through separate downloads of the appropriate code from either a CPU or the external memory. The following is a list of operations supported by the software: AMPS voice; V.22, V.22bis, V.27ter, V.29, and V.32 (@ 4800) over AMPS; and CDPD data.

A timing generator 414 generates clocks required by other modules and external circuitry. The timer 414 provides a watchdog mechanism for the control processor 302 and DSP 410 and generates programmable symbol and codec interrupts for the DSP 410. The timer 414 also coordinates with the external control processor 302 and on the on-chip DSP 410 to implement power-saving sleep modes.

The timer 414 provides all of the digital system clocks. The system crystal 416 is 23.04 MHz. From this start frequency a clock generator 418 provides an 11.52 MHz clock to the timer 414 for use in generating a number of different clocks for use in the system.

This timer 414 also uses a second input frequency of 32.768 kHz to provide additional functions such as a watchdog timer, and a programmable sleep timer with system clock gating for power conservation. This frequency comes from a crystal 420 which is independent of the master clock crystal 416 and is asynchronous with respect to the master clock and its divided down frequencies.

The codec interface 422 is designed to support an audio codec in the 13 bit linear, fixed data rate mode, and a wireline modem codec interface. Data and control information is shifted to and from the codec synchronously with the codec master clock. The audio codec interface 422 provides a serial port interface between the DSP 410 and linear codecs. This interface 442 is programmable to source a jittered 2.048 MHz or a 5.76 MHz and an 8 kHz frame sync (for both transmit and receive). It also simultaneously transmits and receives over two serial data lines at the master clock rate. Sixteen bits of data and control are output on the data transmit line with each rising edge of the master clock, and 16 bits are latched into an internal shift register from the data receive line with each falling edge of the master clock. For added flexibility, the codec interface 422 has the selectability to start serial data transmission or reception coincident with the 8 kHz frame sync or one master clock cycle after the frame sync.

This wireline portion of the codec interface 422 provides a serial port interface between the DSP 410 and a modem analog front end. The interface 422 sources a 5.76 MHz master clock, and a 9.6 kHz frame sync (for both transmit and receive). It also simultaneously transmits and receives over two serial data lines at the master clock rate. Twenty-four bits of data and control are output on the data transmit line with each rising edge of the master clock, and 16 bits are latched into an internal shift register from the data receive line with each falling edge of the master clock. For added flexibility, the codec interface has the selectability to start serial data transmission or reception coincident with the 9.6 kHz frame sync or one master clock cycle after the frame sync.

An analog interface 424 conducts digital data and control information to and from the analog-digital and digital-analog interface 308 (which interfaces with the RF module 301 of the phone) and the DSP 410. This interface 424 buffers up the transmit data to be sent out as well as the incoming receive data. The interface 424 times the output of the transmit data, and accesses the incoming receive data at the appropriate sample rate for each mode (80 kHz for AMPS, and 76.8 kHz for CDPD), while allowing the DSP 410 to access the data at a slower rate. The analog interface 424 channels RSSI and battery measurement information from the analog section to the DSP 410, and outputs power amp levels from the DSP 410 to the analog section. There is a single data bus interface so all of the signals are time multiplexed.

The analog interface 424 provides a 10-bit digital interface to the transmit and receive data, power, RSSI, and battery control information. This interface 424 buffers up transmit data to be sent out as well as the incoming receive data. The interface 424 times the input and output of each of the control signals. In this interface, a single data bus is used for all of the signals.

This interface 424 buffers up to 12 samples of receive data. A 10-bit value is read from an analog-digital converter every sample time (12.5 $\mu$sec for AMPS mode or 13.02 $\mu$sec for CDPD) and input to a FIFO. To deal with the fact that the analog-digital converter outputs signed numbers and the DSP 410 calculates using two's complement numbers, the hardware automatically inverts the most significant bit of the word before passing it on to the DSP 410. The DSP 410 reads the data from the FIFO in a burst of eight or four 10-bit words each symbol time (100 $\mu$sec for AMPS or 52.08 $\mu$sec for CDPD). Since the FIFO is 12 words deep, the DSP 410 needs to read the data out of the FIFO within one half of a symbol period after receiving a symbol interrupt to avoid overflow. To avoid underflow, the DSP 410 needs to activate the receive FIFO at least one symbol prior to reading the first burst of data.

The analog interface 424 buffers up to 12 samples of transmit data. Similar to receive, the DSP 410 writes a burst of 10-bit data words (4 for CDPD or 8 for AMPS) to the FIFO every symbol time. The transmit data is output to the digital-analog converter at twice the sample rate (every 6.25 $\mu$sec for AMPS or 6.51 $\mu$sec for CDPD). To achieve this rate, the interface 424 can be selected to either output each DSP sample twice, or to provide an interpolated sample that is an averaged sample of the two surrounding samples written by the DSP 410. The interface hardware also takes care of inverting the MSB of the data output to the digital-analog converter. To avoid underflow or overflow, the DSP 410 writes the words within one half of a symbol period after receiving a symbol interrupt. It also primes the interface with data one symbol time prior to the beginning of transmission.

The analog interface 424 reads control information (RSSI and battery levels) every symbol time. The DSP 410 controls which signal is actually sampled by the control analog-digital converter, and knows whether the sample in the analog interface control register corresponds to an RSSI measurement or a battery level measurement. Finally, this interface 424 provides a 10-bit output for power level control of the power amplifier. The power amplifier is updated when indicated by the DSP 410. This information is written to the appropriate data converter in response to the sample interrupt following a request from the DSP 410.

A radio interface 426 supplies the voltage enable signals for the transmit circuitry, receive circuitry, and power amplifier on the RF module 301. This interface 426 also allows the DSP 410 to control the programming of the channel synthesizer on the radio, and it provides a monitor mechanism for the DSP 410 to check if the power amplifier is incorrectly active.

The hardware in this interface 426 acts as an I/O port for the DSP 410. The signals are latched and passed to the DSP 410 or to the outputs of the processor chip 303 and can be used as general purpose I/O.

In the radio, a digital signal is used to turn the power amplifier on and off. This signal is set by the DSP 410 and passed through by this interface 426. A signal from the radio indicates that the radio is transmitting. If the radio is transmitting when the digital signal is not active, a failure in the radio has occurred. Circuitry in this interface 426 allows the DSP 410 to detect this situation. If the DSP software is corrupted and does not check for this error condition, a watch dog reset generates a system wide reset in less than 10 seconds. The radio interface 426 also provides additional programmable signals for the DSP 410 to manipulate all of the power control functions in the radio; the antenna selection when antenna diversity is being used; and a time constant switch for the receiver discriminator.

Through the radio interface 426, the DSP 410 programs the channel synthesizer in the radio. To accommodate various channel synthesizers, the DSP 410 controls all of the signals sent to the synthesizer. For example, the DSP 410 generates the synthesizer clock by writing a zero to this interface and then writing a one, writing a zero, etc. The DSP 410 can also receive an indication of lock from the radio through this interface.

The peripheral control module 428 provides an interface between the DSP 410 and the various peripheral modules 414, 422, 424, 426. This interface 428 synchronizes the 11.52 MHz peripheral signals to the 23.04 MHz DSP interface. It also minimizes the dependency of the peripheral module interfaces on the DSP interface.

The peripheral interface 428 allows the DSP 410 to access peripheral registers as part of its program space. To support writes to peripheral registers, the peripheral interface 428 acts as an address and data register into which the DSP 410 writes information. Each peripheral decodes the address lines in order to direct the write data to the appropriate internal register. In the read direction, this interface 428 acts as a selector. The outputs of all peripheral registers that are readable by the DSP 410 are connected to a buffer in the peripheral interface 428. The interface 428 multiplexes these signals onto the DSP data bus when the appropriate address is read. Because the DSP 410 is running off of the 23.04 MHz clock and the peripherals operate on the 11.52 MHz clock, the DSP 410 cannot perform reads or writes to the peripheral registers without two 23.04 MHz clock cycles of dead time between accesses.

The clock generator module 418 provides stable system clocks to all of the modules in the processor chip 303. The clock generator 418 also provides a synchronous reset to each of the modules and outputs a reset for use in the system. It also helps in low power operation by disabling the 23.04 MHz oscillator circuit and/or internal 23.04 MHz and 11.52 MHz clock distribution. The clock generator 418 takes a 23.04 MHz crystal or clock as input and provides a 50% duty cycle 23.04 MHz clock to the DSP portion of the processor chip and an 11.52 MHz clock to all of the peripheral modules and external circuitry. These clocks are used as the master clocks for each module, and all internal signals are synchronous to the 11.52 MHz clock. The processor chip 303 can accept either a crystal or a crystal oscillator as a source for the 23.04 MHz clock. The clock generator 418 also sources the internal and an external ship reset. The reset input is driven by external circuitry or watch dog circuitry and is delayed and synchronized by the clock generator 418 to the rising edge of the 11.52 MHz clock before being passed to the circuitry.

In addition, the clock generator 418 has a 32.768 kHz input which can be from a crystal or an oscillator circuit. The clock generator 418 stabilizes and passes this 32.768 kHz clock to the timer to be used for low power operation.

A general purpose I/O port 430 provides a software controllable interface for the DSP 410. These lines carry data and commands to and from the DSP 410. This I/O port 430 also has dedicated pins in test mode for controlling the operation of the processor chip 303 during testing.

As apparent from the above description and FIG. 4, the processor chip 303 contains analog cellular signal circuitry (a first circuit) that transceives the analog cellular signals, including AMPS signals. This chip 303 also contains CDPD signal circuitry (a second circuit) that transceives CDPD signals. The analog cellular signal circuitry and the CDPD signal circuitry of the processor chip 303 are controlled by the control processor 302, so that the CDPD signals are transceived over the same frequency channels as the analog cellular signals.

The user is provided with a "scratch pad" constituted by static ram 324. A control switch 322 constituted by an EPROM is also provided for user convenience. When a paging signal is received by the handset, the user can be advised by means of vibrator 350 or buzzer 351, both connected to processor chip 302. Additional memory capacity can be provided to the coupled processor chips 302, 303 by means of either RAM 360 or EEPROM 361.

Host connector 370 is used to transfer audio frequency and radio frequency signals from the handset to a host cellular terminal such as would be found in an automobile. By placing the handset in an appropriate cradle included with the host terminal, it is possible for the handset to be used in "hands-free" operation if the host terminal supports this function. An additional telephone type handset can be connected to the portable data terminal through host connector 370.

The portable data terminal/handset of the present invention can be arranged in a number of different types of casings and a number of kinds of configurations. For example, the handset can be attached to the casing of portable PC such as a PDA. The two casings can be configured so that the two devices remain portable either separately or attached to each other. In another configuration, the portable/handset can be attached to a non-portable PC, serving as a communications terminal for that PC. In a third configuration, the portable terminal/handset can be used in a stand-alone arrangement, easily carried in a briefcase or about the person of a subscriber. This configuration can also be used with a mobile station in an automobile.

A major advantage of the present invention is that in its use of a CDPD mode for transmitting data, data can be transferred in a substantially uninterrupted manner even when the moving portable terminal/handset moves from one cell site area to another. Although some interruption may take place, normal redundancy protocols supply the data which otherwise would have been lost. Since the CDPD channels support digital data transfer, digital encryption techniques can be employed to maintain data security. Thus cellular communications can be rendered secure in a way not possible with a normal AMPS system.

Although a number of arrangements of the present invention have been mentioned by way of example, it is not intended that the invention be limited thereto. For example, the present invention can be adapted with the appropriate use of its expansion ports and connection to systems having the appropriate characteristics to support electronic mail, a modem emulation mode, TCP-IP connections, call screening, automatic paging acknowledgement including messaging, and location functions. Accordingly, this invention should be considered to include any and all configurations, modifications, variations, combinations or equivalent arrangements following within the scope of the following claims.

We claim:

1. A telephone handset that communicates with analog cellular signals and with cellular digital packet data (CDPD) signals over frequency channels, comprising:

analog cellular signal circuitry that transceivers analog cellular signals;

CDPD signal circuitry that transceivers CDPD signals;

a discriminating circuit that discriminates between analog cellular signals and CDPD signals; and a control processor, coupled to the discriminating circuit, that controls the analog cellular signal circuitry and the CDPD signal circuitry such that the CDPD signals are transceived over the same frequency channels as the analog cellular signals, wherein the analog cellular signal circuitry and the CDPD signal circuitry are operatively coupled to a single, common radio frequency transceiver, wherein the radio frequency transceiver is responsive to the control processor, and wherein the discriminating circuit is responsive to a difference in paging signals that contain information about analog cellular signals and paging signals that contain information about CDPD signals to cause the control processor to switch between the analog cellular signal circuitry and the CDPD signal circuitry.

2. The handset of claim 1, wherein said control processor comprises means for determining identity data contained in a paging signal.

3. The handset of claim 2, wherein said control processor further comprises means for providing control signals responsive to a determination of the identity data.

4. The handset of claim 2, further comprising means for interrupting communication using the CDPD signal circuitry in response to detection of a paging signal received by the radio frequency transceiver and which contain information regarding analog cellular signals.

5. The handset of claim 3, further comprising means for carrying out an automatic call back responsive to said control signals.

6. A telephone handset that communicates with analog cellular signals and with cellular digital packet data (CDPD) signals over frequency channels, comprising:

analog cellular signal circuitry that transceivers analog cellular signals;

CDPD signal circuitry that transceivers CDPD signals;

a discriminating circuit that discriminates between analog cellular signals and CDPD signals;

a control processor, coupled to the discriminating circuit, that controls the analog cellular signal circuitry and the CDPD signal circuitry such that the CDPD signals are transceived over the same frequency channels as the analog cellular signals, and further comprising a scratch pad memory connected to the control processor, the scratch pad memory comprising a static random access memory providing scratch pad input to the control processor.

* * * * *